United States Patent [19]

Sheridan, III et al.

[11] 4,360,505
[45] Nov. 23, 1982

[54] RECOVERING HYDROGEN FROM GAS STREAM USING METAL HYDRIDE

[75] Inventors: John J. Sheridan, III, Somerville, N.J.; Fred G. Eisenberg, Allentown, Pa.; Gary D. Sandrock, Ringwood, N.J.; Ernest L. Huston, Tuxedo; Edwin Snape, Suffern, both of N.Y.; Raymond P. Stickles, Concord; Gordon C. Cheng, Carlisle, both of Mass.

[73] Assignee: Air Products and Chemicals, Inc., Allentown, Pa.

[21] Appl. No.: 279,883

[22] Filed: Jul. 2, 1981

[51] Int. Cl.³ ............................................. C01B 1/32
[52] U.S. Cl. ...................... 423/248; 252/461; 252/462; 252/463; 252/466 R; 252/466 J; 252/471; 252/472; 252/473; 252/474; 252/476; 252/477 R; 423/648 R
[58] Field of Search ............... 423/644, 648 R, 248

[56] References Cited
U.S. PATENT DOCUMENTS

| 3,141,747 | 7/1964 | Marshall | 51/309 |
| 3,141,748 | 7/1964 | Hoke et al. | 55/25 |
| 3,793,435 | 2/1974 | Reilly et al. | 423/248 |
| 3,839,847 | 10/1974 | Banikiotes et al. | 55/58 |
| 4,036,944 | 7/1977 | Blytas | 423/648 |
| 4,079,523 | 3/1978 | Sandrock | 34/15 |
| 4,096,639 | 6/1978 | Sandrock | 34/15 |
| 4,096,641 | 6/1978 | Sandrock | 34/15 |
| 4,108,605 | 8/1978 | Billings | 23/252 |
| 4,133,426 | 1/1979 | Turillon et al. | 206/0.7 |
| 4,134,490 | 1/1979 | Turillon et al. | 206/0.7 |
| 4,134,491 | 1/1979 | Turillon et al. | 206/0.7 |
| 4,135,621 | 1/1979 | Turillon et al. | 206/0.7 |
| 4,142,300 | 3/1979 | Gruen et al. | 34/15 |
| 4,185,979 | 1/1980 | Woolley | 62/48 |
| 4,200,623 | 4/1980 | Muller et al. | 423/648 R |
| 4,200,624 | 4/1980 | Muller et al. | 423/648 R |
| 4,242,315 | 12/1980 | Bruning et al. | 423/644 |
| 4,300,946 | 11/1981 | Simons | 423/647 |

Primary Examiner—O. R. Vertiz
Assistant Examiner—Wayne A. Langel
Attorney, Agent, or Firm—R. L. Brewer; E. E. Innis; J. C. Simmons

[57] ABSTRACT

This invention relates to an improved adiabatic process for separating hydrogen from mixed gas streams using hydridable materials as the absorbing medium. The improvement comprises utilizing a composite comprising a thermal ballast in admixture with the hydride material to absorb the heat of reaction and to aid in desorption. By virtue of the intimate contact of the ballast with the hydridable material rapid cycle times plus good bed utilization are achieved.

12 Claims, 2 Drawing Figures

RECOVERING HYDROGEN FROM GAS STREAM USING METAL HYDRIDE

TECHNICAL FIELD

This invention pertains to a process for separating hydrogen from a mixed gas stream via the utilization of a hydride.

BACKGROUND OF THE PRIOR ART

Two types of purification and separation processes involving mixed gas streams containing hydrogen are generally used. In one type of purification process the contaminants are adsorbed and a purified hydrogen stream allowed to pass through the bed. In another type of process, hydrogen is removed via contact with a hydridable material and the contaminants passed through the bed. The following patents with respect to the first type of process are believed pertinent:

Banikotes et al, U.S. Pat. No. 3,839,847, disclose a multi-reactor adiabatic pressure swing cycle for purifying a hydrogen rich (97% or greater) gas stream by absorbing the contaminant gases mixed with hydrogen on an absorbent medium, such as silica gel, molecular sieves, or activated charcoal and allowing the hydrogen in pure form to pass through. Banikotes et al also suggests control of temperature fluctuation within the bed, between adsorption and desorption cycles, to approach isothermal operation by proper combination of the adsorption material, e.g. 6–10 U.S. standard mesh silica gel with a non-adsorbent material, such as particulate (6–10 U.S. Standard mesh) aluminum or other materials such as iron or steel, selected with regard to the heat capacity, heat conductivity and density of the combination.

Hoke et al, U.S. Pat. No. 3,141,748, disclose a process for recovering pure hydrogen from a vapor stream comprising hydrogen and a mixture of hydrocarbon compounds. In this process the adsorbent is chosen which has a higher affinity for the hydrocarbon than it has for hydrogen, e.g. activated charcoal or alumina thus permitting the hydrogen to pass through the absorption bed as a relatively pure (99.0+mole percent hydrogen) stream. A two-stage depressurization stage process is used.

The second type of hydrogen purification process utilizes a hydridable material, and such material combines chemically with hydrogen to form metallic hydrides. Thus, in contrast to the processes described above, hydrogen is the component adsorbed and the contaminants are allowed to pass through. The following patents relate to hydrogen separation or storage and storage processes using a hydridable material:

Reilly et al, U.S. Pat. No. 3,793,435 discloses a process for separating hydrogen from other gaseous products such as $O_2$, $N_2$, CO, $CO_2$, $H_2O$ and $CH_4$. Separation is achieved by contacting the gas mixture with a distributed form of an alloy of a rare earth lanthanum and nickel in an active state, the metal forming a hydride on contact with the hydrogen. Hydrogen separation is effected by passing a gas mixture at an initial pressure of 175 psia through a tubular reactor containing an inert, high porosity packing to prevent agglomeration at room temperature removing an effluent gas at a pressure of 116–133 psia and then desorbing by reducing the pressure to 25 psia.

Blytas, U.S. Pat. No. 4,036,944 discloses an isothermal process for recovering hydrogen from gas mixtures and waste gas streams, particularly from refinery sources using a hydrogen solvent. The hydrogen sorbent comprises a hydridable material, e.g., an alloy of lanthanum pentanickel and a polymeric binder. Optionally, the sorbent contains inert components such as copper, nickel or iron. Such components are alleged as useful for heat sinks and heat moderators in the adsorption process. The specific polymeric binder matrix improves the attrition resistance of the hydrogen sorbent, and such binders include block copolymers of polystyrene-polybutadiene and polyisoprene-polystyrene. The examples show utilizing a fixed bed reactor containing reactor tubes loaded with pellets of the sorbent-binder with a jacket around the reactor for passage of cooling water to maintain isothermal conditions. Pellets of lanthanum nickel powder with 15% water glass as well as lanthanum nickel-copper powder mixtures (copper powder addition up to 50% by weight) without the polymeric binder were used to reduce expansion. The resulting phases upon hydrogenation expanded over 4%, and after two cycles of hydrogenation, they disintegrated.

Woolley, U.S. Pat. No. 4,185,979 discloses a process for transferring heat to or from metal hydrides contained in a storage container. In the prior art, tubes were spaced throughout the bed of hydride material and a heat exchange material was circulated outside these tubes to heat or cool the reactor as required. Other processes have used the gas itself as a means of forming or cooling gas streams for absorption or desorption as required.

Billings, U.S. Pat. No. 4,108,605 discloses a process for treating a mixture of hydrogen and impurity gases by passing the gas to a hydride container where the hydrogen is absorbed by the hydride forming material. To facilitate absorption and release of the hydrogen and impurities from the hydride forming material, a cooling fluid pump and heat exchanger and a heating fluid pump and heat exchanger are provided.

Sandrock et al, in U.S. Pat. Nos. 4,079,523; 4,096,639; 4,096,641 and 4,079,523; disclose various hydridable alloys which are suited for recovering hydrogen from a gas stream.

Turillon et al, in U.S. Pat. Nos. 4,135,621; 4,134,490; 4,134,491 and 4,133,426 disclose the use of specially extended particles of solid having low apparent density distributed within a mass of metal hydride as a system for storing hydrogen. Mixtures of hydridable metal and particulate solids, i.e., metal powders such as nickel powder are added to the hydrogen storage vessel. Also disclosed are the use of dry diatomaceous earth, lignin, metal whiskers, the powder combined to provide a packing density of not greater than 30% of the theoretical density of the powder itself. The '491 patent discloses the use of collapsible structures.

In another document, Sandrock et al disclose an adiabatic process which uses a thermal ballast with a hydride storage material to recover the energy generated during exothermic hydriding, that energy stored in the thermal ballast. The examples show using a bath of water or molten sodium sulfate decahydrate as thermal ballast to recover the heat generated during hydriding and recovering the heat from the bath to enhance desorption.

BRIEF SUMMARY OF THE INVENTION

This invention relates to an improved adiabatic type process for separating hydrogen from a gas mixture.

The improvement permits one to achieve faster cycling times while using minimal energy requirements and achieving excellent bed effectiveness. The improvement in an adiabatic hydrogen separation process comprises:

(a) passing a gas mixture containing hydrogen through a bed containing an intimate composite of hydridable material and inert thermal ballast under conditions such that the composite moves from an initial hydrogen pressure, hydrogen concentration and temperature ($P_1,C_1,T_1$) to a final hydrogen pressure, hydrogen concentration and temperature ($P_2,C_2,T_2$) and $P_2$ is greater than $P_1$, $C_2$ is greater than $C_1$ and $C_2-C_1$ is at least 50% of the theoretical hydriding capacity and $T_2$ is greater than $T_1$, said ballast being incorporated in an amount such that the composite can absorb at least 50% of the theoretical energy of hydride formation; and (b) desorbing hydrogen from the bed by reducing the pressure and utilizing the energy of hydride formation to aid in desorption.

By carrying out the process in the manner described, it is possible to approach an adiabatic pressure-swing process utilizing the heat of reaction retained in the composite to effect desorbtion of the hydride and to permit one to achieve extremely fast absorption and desorption rates. It also permits one to achieve substantial utilization of the bed e.g., greater than 50%; and to minimize attrition of the hydridable material due to the presence of the thermal ballast in intimate contact with the hydridable material and to minimize energy transfer between the system and the external environment.

THE DRAWINGS

DETAILED DESCRIPTION OF THE INVENTION

Figure 1:
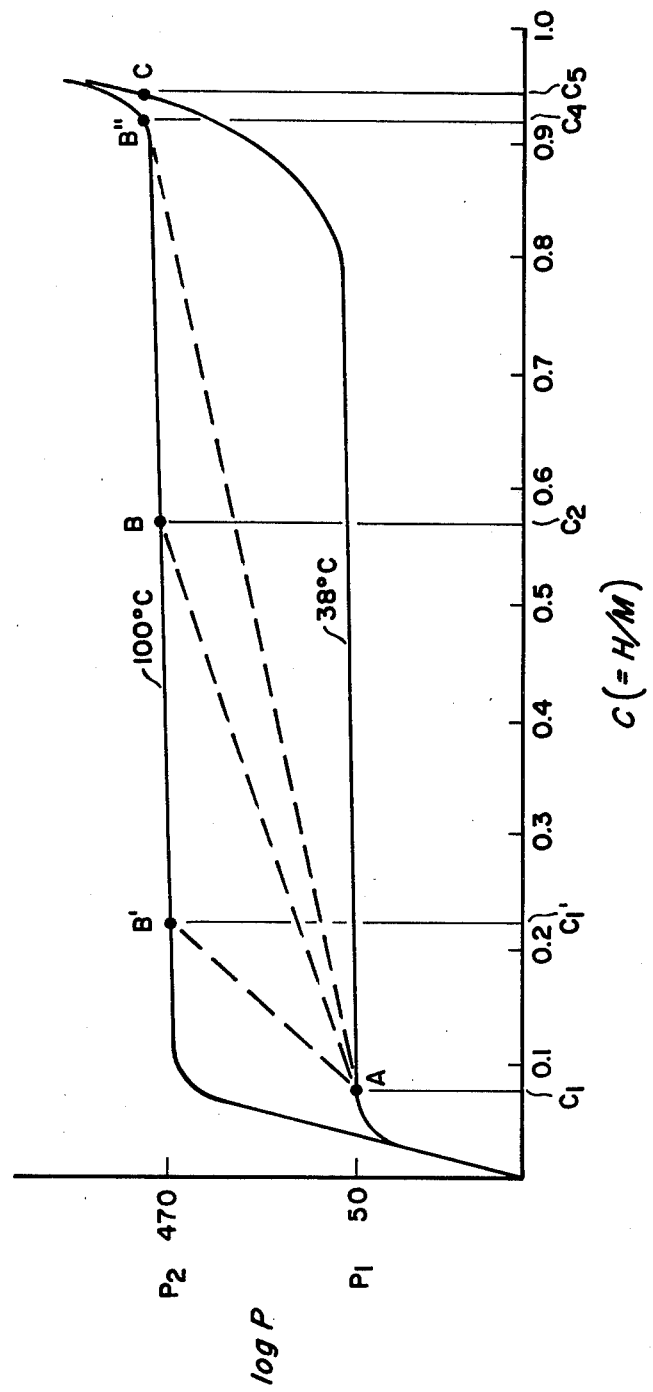
FIG. 1 is a plot of idealized equilibrium curves of a hydride-forming metal, in which typical isotherms are shown with relation to the equilibrium pressure versus hydrogen capacity of the hydride-forming metal.

To facilitate an understanding of the present invention and particularly the significance of the use of a composite of a hydridable material and thermal ballast as opposed to external thermal ballast or isothermal operation reference is made to FIG. 1. In FIG. 1 there is shown two isothermal equilibrium curves, for the temperatures of 38° C. and 100° C. for a $LaNi_5$-$H_2$ system, wherein the log of the partial pressure (p) of hydrogen (ordinate) is plotted against bed loading capacity (c) (abscissa) namely hydrogen to metal ratio (H/M). By way of example, the starting point for an idealized process in accordance with the present invention, by reference to FIG. 1, with starting conditions of 50 psi, partial pressure hydrogen ($P_1$) initial hydrogen concentration $C_1$ and 38° C., ($T_1$) is point A, a point along the 38° C. isothermal curve. Upon pressurization of the adiabatic reactor containing an unballasted hydride-forming metal mass one would traverse a pressure and loading curve along the line A-B' to point B' having a partial pressure $P_2$ and hydrogen concentration $C_1'$ on the 100° C. isothermal curve. In this system very little hydrogen is absorbed as noted by the difference between $C_1'$ and $C_1$. In a partially ballasted adiabatic system the hydridable metal mass would traverse the line A-B. Thus, the final equilibrium condition realized by the reactant mass is a point further along to the higher loading end of the 100° C. isotherm, namely, point B. However, the amount of ballast can be adjusted as will be disclosed so that essentially full loading can be achieved which corresponds to B" on the 100° C. isotherm. In an isothermal system the path would follow the isothermal line to point C on the 38° C. isothermal line.

The problem heretofore has been that absorption and desorption along the path A-B", or more generally, along the path A-B in an adiabatic system or inherently along the path A-C in an isothermal system has been slow particularly in large reactors. As a result the commercial use of hydridable materials in effecting separation of mixed gases has been limited. Now, though by use of the composite of hydridable material and thermal ballast in spatially distributed form and in specific relation to the adiabatic process it is possible to traverse line A-B", or more generally, along the path A-B at a faster rate than systems heretofore designed.

The ballast material, with which the hydridable material is combined in spatially distributed manner to form a composite is an inert, small particulate material, such as metals generally of copper, nickel, aluminum or iron. Typically, the ballast will have good heat conductive properties and will have a particle size approximately 1-100 times (but not in excess of 4 mesh, and preferably less than 40 mesh) that of the hydridable material after hydrogenation. For most cases, the particle size of the hydridable material after hydriding is from submicron to 100 mesh in diameter, and the ballast will be of similar size.

The term "spatially distributed", as applied to ballast material, is employed to describe generically ballast material which is present as individual particles, randomly distributed so as to be in contact with the hydridable material; ballast material which is present as a reticulated network such as obtainable by sintering ballast material with hydridable material to form ballast-bound integral composite structures, a particularly useful form of which is that of pellets as disclosed in copending application U.S. Ser. No. 279,713, filed in the names of Sandrock et al concurrently herewith and incorporated by reference; ballast material which is present in a pellet as one or more masses such as a sphere, to which hydridable material in a thin layer is adhered; ballast material which is present in pellets as any combination of the foregoing, for example, a combination of a reticulated network and randomly distributed particles, or a combination of randomly distributed equiaxed particles and randomly distributed fine wire-like or fiber-like particles.

For an adiabatic reactor, the amount of thermal ballast employed in the composite controls, in part, the amount of hydrogen removed from the feed stream. Other factors include hydrogen partial pressure of the feed stream, hydridable material type, feed stream temperature and velocity, desired hydrogen recovery pressure, etc. If the quantity of thermal ballast is too small, the entire reactor mass (thermal ballast plus hydridable material) will be heated by the exothermic hydriding reaction to a temperature, $T_2$, such that the hydriding reaction stops before the hydridable material is completely converted to hydride. The temperature $T_2$ is determined by the hydrogen partial pressure in the feed stream and the pressure-temperature relationship that exists for the particular hydridable material. If the thermal ballast exceeds a critical amount, the energy provided by the exothermic hydriding reaction will be insufficient to heat the reactor to $T_2$. In this case, the hydriding reaction will proceed rapidly to completion but the final temperature of the reactor mass will be less than the desired value $T_2$. This lower temperature represents an inefficient use of the bed volume and reduced hydrogen pressures available during desorption. The desired quantity of thermal ballast will result in the reactor mass rising from the initial temperature $T_1$ to the final temperature $T_2$ just as the hydridable material is completely hydrided, and for this condition the ratio of the weight of the thermal ballast to the weight of hydridable material is termed the theoretical ratio.

In the present invention, it is necessary to provide sufficient thermal ballast to achieve at least 50% and preferably at least 90% of the theoretical ratio without use of external ballast or heat transfer medium. Excessive ballast is undesirable. Therefore, ballast is used in a range of 90–150% of the theoretical ratio.

The 50% minimum required amount of ballast material for achieving this level then is determined by ascertaining an initial temperature, calculating the heat absorbtion characteristics of the hydridable material and the ballast, ascertaining the heat released by hydriding the amount of hydridable material present ($\Delta H$), ascertaining the temperature at which the equilibrium pressure of hydrogen with respect to the hydride is equal to the partial pressure of hydrogen in the feed gas, determining a $\Delta T$ by difference between the initial temperature ($T_1$) and the maximum permissible temperature ($T_2$), applying the $\Delta T$ to a summation of the heat absorption characteristics of the materials present in the reactor and solving for the unknown quantity of ballast as in the equation below. To be efficient $\Delta T$ should be at least 10° C. and generally in a range from 20° to 80° C.

$$\Delta T = \frac{\Delta H}{(Cp\ \text{Hydride})\ (\text{wt Hydride Material}) + (Cp\ \text{ballast})\ (\text{wt ballast})}$$

It is advantageous and preferred to employ pellets which include the ballast material so the pellet binder rather than use polymeric binder. Such pellets transfer heat much more readily and permit faster absorption and desorption rates. In this regard pellets are advantageously made by sintering hydridable material such as $LaNi_5$ with nickel or other sinterable metal powder. Sintering can be conveniently done by heating blended amounts of $LaNi_5$ and metal powder which have been pressed or otherwise formed (e.g. by extrusion and slicing) into pellets. In the case of nickel, sintering can be carried out at temperatures in the range of about 700° C. to about 900° C. for about 0.1 to about 2 hours.

Alternatively, pellets can be formed which consist of the hydride-forming material and ballast powder by binding with a resinous binder, such as silicone rubber in a proportion of about 0.01 to 5% by weight. This solid mixture, typically is about 4 grams in weight and in the shape of a cylinder one-half inch high and a half-inch in diameter. A high pressure pelletizer, capable of pelletizing at 1,000 to 30,000 psi may be used. The pressed pellet can be cut, such as into quarter-cylinder segments, about one-quarter inch on a side, before use. The purpose of cutting the pelletized composite is to increase the surface area for hydrogen reaction and diffusion throughout the composite. The cut pellets are also activated, preferably such as by exposure to high pressure hydrogen, prior to use. However, as will be seen from the examples, plastic or polymeric binders inhibit heat transfer within the pellet and often this causes unacceptable reaction front lengths and reaction front velocities.

Important to the operability of the present invention, and specifically to short cycle times, e.g. 10 minutes or less, whereby hydrogen is quickly adsorbed and/or released by the hydridable material, is the rapid heat removal or supply to the reacting particles which is facilitated by the short heat transfer path between the thermal ballast and hydridable material. This short heat transfer path is ensured by providing an intimate mix of the small particle heat ballast material and hydridable metal in forming the composite preferably in the form of pellets as used in the reactor.

By providing the intimate spacing of the heat ballast, a number of inefficiencies noted in the prior art are avoided. For example, at temperatures up to about 300° C., which are of most interest in practicing hydrogen recovery processes, heat is transferred by conduction at loci where pellets or particles are in contact one with another and by convection using the gas stream as a convection medium. Over distances of many particles or pellets, heat conduction as a heat transfer mechanism generally has been relatively inefficient due to small contact surface areas and poor heat conductivity of the binder. Heat transfer by hydrogen convection is also inefficient because of tortuous gas flow passages and because of the generally low heat capacity of gases in the gas stream. By means of the present invention, where the heat transfer path is short between the reacting particle and the ballast, the conduction and convection processes are facilitated and reaction times may be made short. This is not the case, for example, with the heat ballast external to and not in contact with or in intimate mixture with the hydridable material; in this case the rates of absorption and desorption are slower.

In preparing the composite material, for example as pellets, for use in the present invention, it is advantageous to include the heat ballast material, for example, a metal such as nickel, in the form of particles each of which is only a small fraction of the volume of the pellet. Recognizing that after a few hydriding-dehydriding cycles, the hydridable material itself will be reduced to particle sizes of a few microns, the size of the hydridable material itself used to form the pellet is not really important so long as each pellet contains a substantial number of hydridable metal particles, for example, at least about 10 particles.

With regard to preferred ranges of operating parameters, the process of the present invention generally is limited, in temperature, to about 500° C. as its upper limit. Hydrogen partial pressure within a concentration range from a trace to about 70% by volume is generally cycled within a range of which 0.1 atmosphere absolute is the lower limit and 200 atmospheres hydrogen is the upper limit. As indicated hereinbefore, temperature of operation is a function of the inherent nature of the hydridable material and the partial pressure of hydrogen in the feed gas. The upper limit of 500° C. is merely a rough guide, this temperature being usable only with all-metal pellets or those bound by heat resistant resins such as polytetrafluoroethylene.

After completion of hydriding of a bed by extraction of hydrogen from a gas stream, it is advantageous to eliminate the hydrogen depleted gas from the reactor containing the bed by rinsing with a gas stream, for example a hydrogen gas stream before desorbing hydrogen from the bed. This procedure improves product purity. Further, after desorption is completed at a relatively low pressure, it is advantageous to prepressurize the reactor containing the bed to a substantial fraction of the pressure of the gas stream being treated before allowing flow of the gas stream through the bed. Prepressurization may be conveniently achieved through the use of the hydrogen-depleted gas stream.

A wide variety of hydride-forming metals may be used, including Mg, FeTi, CaNi$_5$, LaNi$_5$ (and other AB$_5$ alloys). Typically, the metallic hydride is an alloy of at least two elements from the group of iron, titanium nickel, calcium, manganese, magnesium and rare earth elements. Suitable materials are sold by MPD Technology Corp. of Wyckoff, N.J. under the trademark HYSTOR such as alloys having the chemical formulas of FeTi and modifications suh as Fe$_{0.9}$Mn$_{0.1}$Ti and Fe$_{0.8}$Ni$_{0.2}$Ti, CaNi$_5$ and modifications such as Ca$_{0.7}$M$_{0.3}$Ni$_5$, Ca$_{0.2}$M$_{0.8}$Ni$_5$, MNi$_5$(CFM)Ni$_5$, LaNi$_5$ and modifications of lanthanum and mischmetal materials such as LaNi$_{4.7}$Al$_{0.3}$ and MNi$_{4.5}$Al$_{0.5}$, Mg$_2$Ni and Mg$_2$Cu (M=mischmetal and CFM=cerium free mischmetal). Various other hydride-forming metals are known and referred to in the above-referenced patents in the prior art relating to metal hydride-hydrogen sparation processes and are incorporated by reference. Other specific hydride materials are disclosed in U.S. Pat. No. 4,142,300—Gruen and are incorporated by reference.

In the absorption stage of the rapid cycling process of this invention, a front is established as defined by $T_2-T_1$ where $T_2$ is the maximum temperature of the bed, and $T_1$ is the minimum temperature of the bed ahead of the front. With proper selection of ballast and incorporation as described supra the front as defined by $T_2-T_1$ in °C. will exceed about 40° C., and preferably 50° C. and will have a length less than 10 feet and preferably less than 3.5 feet. Further, the ballast, when combined in proper spatially distributed form, as described, permits the front to move at a rapid velocity of at least 0.1 ft./min., and preferably 0.35 ft./min. through the reactor.

After the front passes the length of the bed, the hydridable material has generally reached its absorption capacity and feed to the bed is terminated. Then the bed is desorbed by lowering the bed pressure. Generally this is to the starting point $P_1$. Pressure reduction is controlled so that a uniform (±50%, and preferably ±20%) rate of hydrogen desorption is obtained from the hydridable material. This is determined empirically. The object of the desorption reaction is to proceed substantially along the line B″-A. If pressure reduction is too fast then subcooling occurs and the desorption rate slows. If pressure reduction is too slow then one is not utilizing the stored heat properly to effect rapid desorption. The process of the present invention, when carried out employing metal bonded composite hydride structures, e.g. pellets, and in the absence of external ballast or heat transfer medium, is characterized by a relatively greater latitude with respect to sub-cooling. This is not to say that when using metal-bonded hydride pellets a hydrogen reactor system cannot be subcooled during desorption but rather, due to good intra-pellet heat transfer, subcooling will not usually occur at relatively rapid rates of desorption.

Figure 2:
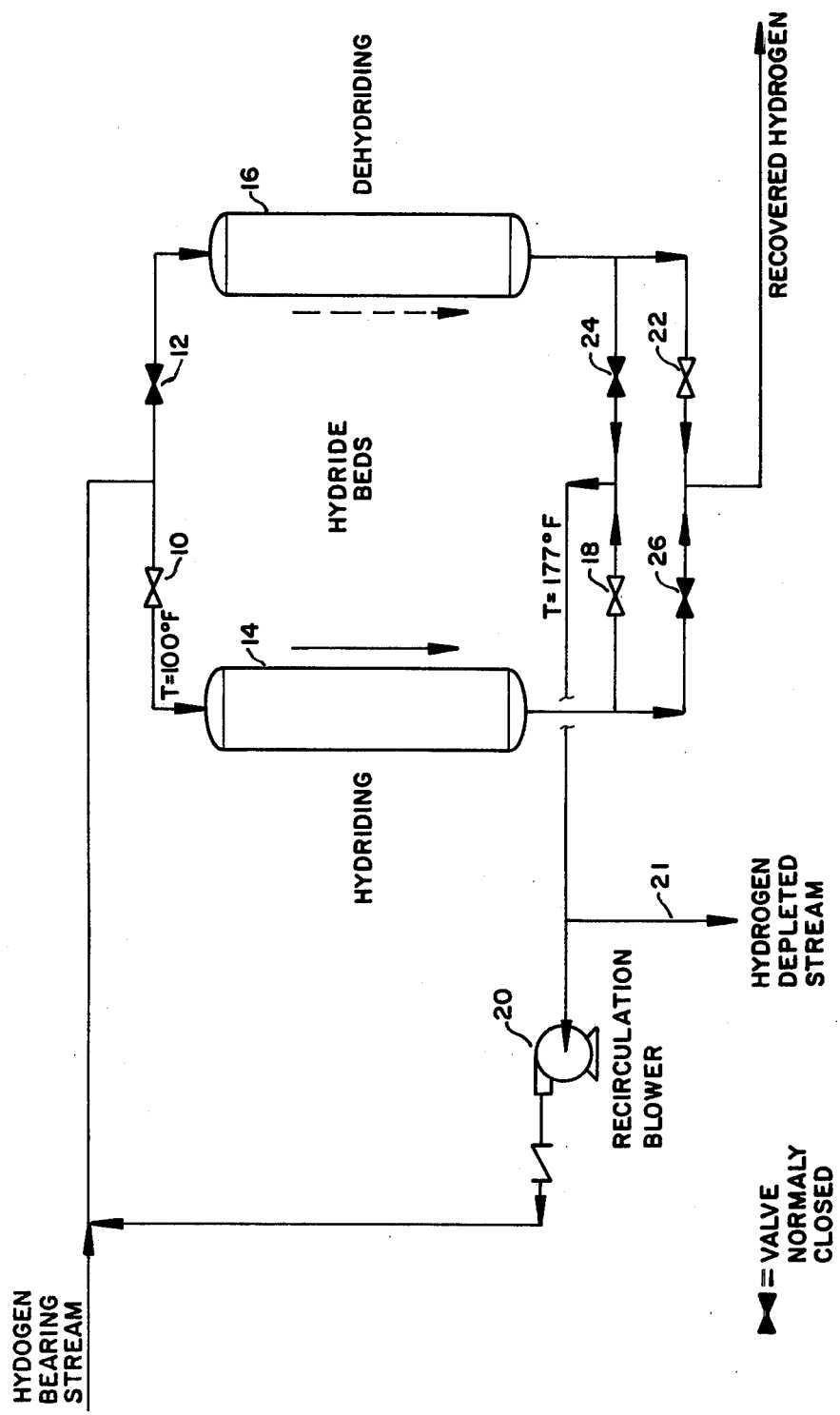
FIG. 2 is a schematic process diagram of the process apparatus used in the preferred form of the present invention.

The process of this invention may typically be employed in an alternately cycled multi-reactor system, as illustrated in FIG. 2. As shown in that diagrammatic illustration, valves 10 and 12 are alternately opened and closed to permit a hydrogen-bearing feed stream into their respectively associated reactors 14 and 16. With valve 12 closed and valve 10 opened, in the phase of operation illustrated, hydrogen-bearing feed stream passes through hydriding reactor 14 and hydrogen-depleted off-gas therefrom passes through open valve 18 either back through recirculation blower 20 (optional) or to hydrogen-depleted stream removal line 21. Gas from recirculation blower 20 is recycled, in combination with incoming hydrogen-bearing feed stream, for further hydrogen extraction. With reactor 14 in the hydriding mode, valve 24 is closed and previously hydrided reactant in reactor 16 is permitted to degas by depressurization while evolved hydrogen passes through valve 22 to the recovered hydrogen stream.

Upon completion of the hydriding reaction in reactor 14 and the dehydriding reaction in reactor 16, valve 22 is closed and reactor 16 is repressurized to $P_2$. Valves 12 and 24 are then opened to permit beginning of the hydriding reaction in the next cycle of reactor 16, while valves 10 and 18 are closed and valve 26 is opened to permit, upon depressurization of the reactant in reactor 14, dehydriding and passage of evolved hydrogen from reactor 14 to the recovered hydrogen stream. In FIG. 2, typical temperatures to and from the hydriding reactor of 100° F. (37° C.) and 177° F. (80° C.) are indicated. Such process temperatures would be within a normal range for a hydriding pressure of about 400–500 psia (about 27.2 to 34 atmospheres absolute) and a dehydriding pressure of about 20–50 psia (1.36 to 3.4 atmospheres absolute), for a hydrogen-bearing feed stream.

The following examples are provided to illustrate the practice of the invention.

EXAMPLE 1

The design of a system for effecting separation of hydrogen from an ammonia purge gas containing 60% hydrogen, 20% nitrogen, 11% methane, 6% argon, and 3% ammonia at a pressure of 500 psia, an inlet temperature of 60° C. with lanthanum pentanickel as the hydridable material using the figure showing the relationship between hydrogen partial pressure and equilibrium temperature is as follows:

Based on this feed data, the inlet hydrogen partial pressure is 300 psia, and the design desorption pressure is 30 psia. The equilibrium temperature limits for this plot are 92° C. and 24° C. Thus, a 68° C. temperature rise in the lanthanum pentanickel can occur during absorption.

A composite pellet permitting absorption of 100% of the heat of reaction during absorption and assuming 100% absorption and utilization of that heat for desorption is designed assuming nickel powder (325 mesh) is combined with particulate lanthanum pentanickel (325 mesh). The nickel powder has a particle size, i.e. within 50±% of the particle size of the lanthanum pentanickel. The design energy criteria for the composite are as follows:

(a) heat of reaction;
(b) heat capacity of LaNi$_5$;
(c) heat capacity of nickel;
(d) heat capacity of H$_2$;
(e) heat capacity of binder—none used as the design pellet is a sintered pellet with nickel as the binder.

On the basis of 100 grams lanthanum pentanickel, the design pellet consists of 18.3% lanthanum pentanickel and 81.7% nickel. Although for energy purposes the quantity of a larger size nickel powder would remain the same, such large size particles may not necessarily give the heat transfer to achieve the desired short reaction front and fast reaction front velocity necessary to give commercially desirable cycling times.

To achieve the appropriate reaction front as designed by $T_2-T_1$, the flow rate through an insulated tubular reactor packed with these composite pellets of one-half inch diameter, one-half inch in length, must be regulated to maintain the design conditions. For example even though a composite is properly designed it is possible to "overpower" the composite by utilizing too fast a flow rate. The capacity of the composite may be under utilized by too slow a rate. For most cases, a reaction front length of 1-4 feet is used.

EXAMPLE 2

A series of hydrogen separations were made using a gas blend of 50% hydrogen and 50% methane (volume percent) as the feed for Runs 1-4. The feed for subsequent runs was ammonia purge gas as described in Example 1. One type of composite pellets were formulated utilizing an initial composition consisting of 24.3% lanthanum pentanickel (325 mesh U.S. standard), 72.8% nickel powder (80 mesh U.S. Standard) and 2.9% of a silicone rubber, such percentages being by weight. The pellets were fabricated by mixing the prescribed amounts of components and then forming composite, hydrogen permeable cylinders on a Carver press incorporating a standard KBR tablet dye. The cylinders produced were one-half inch in diameter and one-half inch in length, then diced.

The sintered $LaNi_5$/Nickel ballasted pellets were prepared by mixing $LaNi_5$ (25%) and nickel powder sold under the trademark, Inco 123 and then pressing into pellets. The pellets were sintered at 1400° F. for 30 minutes under flowing argon. After sintering the pellets were crushed and sieved to $-4$ to $+10$ mesh U.S. standard size. Other types of composites specified were prepared in a manner similar to this, in conventional manner or as in Example 1.

An insulated 5 foot, ¾ inch tubular reactor having an ID of 0.68 inches was filled with approximately 1,000 grams of composite pellets. After loading, the column was prepressurized with methane to 500 psia to minimize pressure surges during introduction of the feed. After prepressurization, the feed was introduced into the bottom of the column at 500 psia. A frontal length was calculated by monitoring the exit gas from the reactor and dividing the time required from introduction of the feed to time it took for the hydrogen to break through the reactor by the superficial velocity of the feed gas. Table 1 shows the summary of several runs, and pellet forms using this feed gas.

TABLE 1
BREAKTHROUGH DATA

| Run | Alloy | Wt % | Ballast | Wt % | Binder | Wt % | Pellet Size | Inlet Flow SCFH | Total Pressure (psia) |
|---|---|---|---|---|---|---|---|---|---|
| 1 | LaNi5 | 24.3 | Ni | 72.8 | Si* | 2.9 | ¼" cu. | 19.9 | 505 |
| 2 | " | " | " | " | " | " | " | 19.9 | 500 |
| 3 | " | " | " | " | " | " | " | 12.7 | 515 |
| 4 | " | " | " | " | " | " | " | 6.5 | 505 |
| 5 | " | 23.8 | Al2O3 | 71.4 | " | 4.8 | " | 7.0 | 506 |
| 6 | " | " | " | " | " | " | " | 12.7 | 515 |
| 7 | " | " | " | " | " | " | " | 12.5 | 499 |
| 8 | " | " | " | " | " | " | " | 8.5 | 523 |
| 9 | " | " | " | " | " | " | " | 8.5 | 504 |
| 10 | " | " | Ni | 71.2 | Polyethylene-5 | | ⅛" cu. | 12.6 | 500 |
| 11 | " | " | " | | | | | 40.10 | 500 |
| 12 | " | " | " | | | | | 40.1 | 500 |
| 13 | " | " | " | | | | | 25.4 | 500 |
| 14 | " | 25 | Ni | 75 | None Sintered | | ¼" cu. | 12.3 | 500 |
| 15 | " | " | " | " | " | | | 40.4 | 500 |
| 16 | " | " | " | " | " | | | 4.2 | 500 |
| 17 | " | " | " | " | " | | | 40.1 | 490 |
| 18 | " | " | " | " | " | | | 25.4 | 495 |

| Run | Starting Temp. °C. | y (mole frac) | $\theta_B$ (min) | $\theta_f$ (min) | $V_{act}$ (ft./min) | $V_f$ (ft/min) | $L_f$ (ft) | Capacity at $\theta_f$ |
|---|---|---|---|---|---|---|---|---|
| 1 | 26 | 0.385 | 4.0 | 4.8 | 6.5 | 0.61 | 3.0 | 83 |
| 2 | 23 | 0.395 | 3.8 | 4.2 | 6.6 | 0.64 | 2.71 | 83 |
| 3 | 26 | 0.39 | 8.7 | 7.2 | 4.1 | 0.41 | 2.91 | 82 |
| 4 | 25.2 | 0.405 | 15.8 | 7.8 | 2.1 | 0.20 | 1.58 | 87 |
| 5 | 25.0 | 0.617 | 7.9 | 2.11 | 2.87 | 1.13 | 2.4 | 46** |
| 6 | 25.0 | 0.617 | 5.2 | 1.26 | 5.1 | 2.06 | 2.6 | 46** |
| 7 | 22 | 0.599 | 1.85 | 4.72 | 5.76 | 1.4 | 6.6 | 46 |
| 8 | 22 | — | 3.5 | 5.06 | 3.7 | 0.95 | 4.79 | 44 |
| 9 | 22 | — | 3.3 | 5.13 | 3.87 | 0.96 | 4.89 | — |
| 10 | 23 | — | 2.05 | 12.8 | 4.9 | 0.93 | 10.0 | 80 |
| 11 | 23 | — | 0.98 | 4.0 | 15.6 | 2.9 | 8.9 | " |
| 12 | 24 | — | 0.91 | 4.57 | 15.6 | 2.8 | 10.2 | " |
| 13 | 23 | — | 2.3 | 4.9 | 9.8 | 1.99 | 5.17 | " |
| 14 | 19 | — | 11.4 | 13.2 | 3.2 | 0.37 | 0.67 | 95 |
| 15 | 24 | — | 3.0 | 4.7 | 10.5 | 1.22 | 1.99 | " |
| 16 | 26 | — | 33 | 38.0 | 1.11 | 0.13 | 0.67 | " |
| 17 | 25 | — | 3.19 | 4.69 | 10.7 | 1.22 | 1.83 | " |
| 18 | 25 | — | 5.3 | 7.12 | 6.7 | 0.77 | 1.34 | 95 |

*Si = silicone resin
**decreased capacity noted, reason not determined

The data of Table 1 shows that the breakthrough front length $L_f$ is proportional to the half power of the front velocity $V_f$, i.e., $L_f \alpha V_f^{\frac{1}{2}}$.

Comparing the performance of the pellet formulations listed in Table 1, the superior breakthrough properties of the all metal, sintered pellet (Runs 14–18) are readily apparent. This result may be attributed to:

(1) the improved inter-pellet heat transfer as a result of more intimate hydride/ballast contact, and (2) open pellet pores. The silicone and polyethylene will to some extent fill the pellet pores retarding the transport of $H_2$ within the pellet.

But, the resin bonded systems performed well in view of the short reaction front $L_f$ obtained and high $V_f$, e.g., above 0.4. The polyethylene bonded system did the poorest and that may have been attributable to plugging of the pores.

What is claimed is:

1. A rapid cycling process for separating hydrogen from a gas mixture which comprises:
   (a) passing a gas mixture containing hydrogen through a bed containing an intimate composite of hydridable material and inert thermal ballast under conditions such that the composite moves from an initial hydrogen pressure, hydrogen concentration and temperature ($P_1$, $C_1$, $T_1$) to a final hydrogen pressure, hydrogen concentration and temperature ($P_2$, $C_2$, $T_2$) and $P_2$ is greater than $P_1$, $C_2$ is greater than $C_1$ and $C_2-C_1$ represents at least 50% of the theoretical hydriding capacity and $T_2$ is greater than $T_1$, said ballast being incorporated in an amount such that the composite can absorb at least 50% of the theoretical energy of hydride formation; and
   (b) desorbing hydrogen from the bed by reducing the pressure and utilizing the energy of hydride formation to aid in desorption.

2. The process of claim 1 wherein said composite is a pellet containing a hydridable material having at least two elements selected from the group consisting of iron, nickel, calcium, manganese, magnesium, titanium and rare earth elements and a metal powder as the ballast.

3. The process of claim 2 wherein the gas mixture is passed through said bed such that the length of the reaction front is less then 6 feet, the front velocity is grater than 0.3 feet per minute, and $T_2-T_1$ exceeds 40° C.

4. The process of claim 3 wherein the ratio of ballast to hydridable material in the pellet is 90 to about 150% of the theoretical ratio.

5. The process of claim 4 wherein the percent hydrogen in the gas mixture is from a trace amount to about 70 percent by volume.

6. The process of claim 5 wherein the rate of desorption is controlled such that the mass flow rate of hydrogen removed from the reactor during desorption does not deviate more than ±50 percent.

7. The process of claim 6 wherein after said desorption the reactor is pressurized to the operating pressure prior to introduction of the feed gas stream.

8. The process of claim 2 wherein before the step of desorbing the hydrogen from the pellet, a gas stream is passed as a rinse through the reactor containing said bed.

9. The process of claim 8 wherein the gas stream passed through said reactor as a rinse is a hydrogen gas stream.

10. The process of claim 8 wherein the process of absorption and desorption is carried out in multiple reactors.

11. The process of claim 2 wherein said pellet is a sintered pellet.

12. The process of claim 1 wherein said composite contains sufficient ballast to provide at least 90% of the heat necessary to effect desorption of the hydridable material in the rapid cycling process.

* * * * *